(12) United States Patent
Hilsky et al.

(10) Patent No.: US 7,104,154 B2
(45) Date of Patent: Sep. 12, 2006

(54) BICYCLE SHIFT CONTROL DEVICE

(75) Inventors: Alexander Hilsky, Pesterwitz (DE); Masao Kojima, Izumi (JP)

(73) Assignee: Shimano Inc., Osaka (JP)

( * ) Notice: Subject to any disclaimer, the term of this patent is extended or adjusted under 35 U.S.C. 154(b) by 522 days.

(21) Appl. No.: 10/446,686

(22) Filed: May 29, 2003

(65) Prior Publication Data

US 2004/0237698 A1    Dec. 2, 2004

(51) Int. Cl.
 *F16C 1/10* (2006.01)
(52) U.S. Cl. .................. 74/502.2; 74/502; 74/501.6
(58) Field of Classification Search ............... 74/500.5, 74/501.6, 502.2, 527, 535; 280/260, 236, 280/238
See application file for complete search history.

(56) References Cited

U.S. PATENT DOCUMENTS

| | | | |
|---|---|---|---|
| 5,429,012 A | | 7/1995 | Ikeda et al. |
| 5,458,018 A | * | 10/1995 | Kawakami .................. 74/502.2 |
| 5,476,019 A | * | 12/1995 | Cheever et al. ............ 74/502.2 |
| 5,564,316 A | | 10/1996 | Larson et al. |
| 5,577,413 A | | 11/1996 | Tagawa et al. |
| 5,584,213 A | | 12/1996 | Larson et al. |
| 5,588,331 A | * | 12/1996 | Huang et al. .................. 74/489 |
| 5,662,000 A | | 9/1997 | Patterson et al. |
| 5,666,859 A | * | 9/1997 | Arbeiter et al. ................ 74/489 |
| D389,391 S | | 1/1998 | Duston |
| D391,824 S | | 3/1998 | Larson |
| D391,825 S | | 3/1998 | Larson |
| 5,732,598 A | * | 3/1998 | Shoge et al. ............. 74/473.13 |
| D396,396 S | | 7/1998 | Larson |
| 5,857,387 A | | 1/1999 | Larson et al. |
| 5,862,709 A | * | 1/1999 | Kageyama ................... 74/489 |
| 5,893,573 A | | 4/1999 | Arbeiter |
| 5,964,123 A | | 10/1999 | Arbeiter |
| 6,042,132 A | * | 3/2000 | Suenaga et al. ............ 280/260 |
| 6,055,882 A | | 5/2000 | Arbeiter et al. |
| 6,199,447 B1 | | 3/2001 | Lump et al. |
| 6,212,972 B1 | | 4/2001 | Yamane |
| 6,244,207 B1 | | 6/2001 | Chen |
| 6,367,347 B1 | | 4/2002 | Blaschke et al. |
| 6,370,981 B1 | * | 4/2002 | Watarai ..................... 74/502.2 |

(Continued)

FOREIGN PATENT DOCUMENTS

DE        29717253 U1     1/1998

(Continued)

OTHER PUBLICATIONS

SRAM Inter Bike 2000; 4 pages.

(Continued)

*Primary Examiner*—Richard W. Ridley
*Assistant Examiner*—Justin Krause
(74) *Attorney, Agent, or Firm*—Shinjyu Global IP Counselors, LLP

(57) ABSTRACT

A bicycle shift control device comprises a fixed member and a rotatable member. The fixed member is adapted to be fixedly coupled to a bicycle handlebar adjacent a hand gripping area of the handlebar. The rotatable member is rotatably coupled to the fixed member for rotation around the handlebar between at least two shift positions. One of the fixed and rotatable members has a visible fixed contoured line and the other of the fixed and rotatable members has a visible movable contoured line adjacent the visible fixed contoured line. The visible fixed and movable contoured lines cooperate with each other to define a geometrically shaped visible area located between them. The geometrically shaped visible area is configured to change upon rotation of the rotatable member between the shift positions to indicate at least one of the shift positions.

22 Claims, 14 Drawing Sheets

U.S. PATENT DOCUMENTS

| | | |
|---|---|---|
| 6,389,920 B1 | 5/2002 | Chen |
| 6,389,929 B1 | 5/2002 | Calilung et al. |
| 6,467,368 B1 | 10/2002 | Feng et al. |
| 6,532,890 B1 * | 3/2003 | Chen .................. 116/28.1 |
| 2001/0031682 A1 | 10/2001 | Auer et al. |
| 2002/0128112 A1 | 9/2002 | Hanatani |

FOREIGN PATENT DOCUMENTS

| | | |
|---|---|---|
| DE | 29806919 U1 | 8/1998 |
| DE | 299 08 582 U1 | 9/1999 |
| EP | 0759393 A1 | 2/1997 |
| EP | 1238899 A1 | 9/2002 |
| FR | 2742407 A1 | 6/1997 |
| GB | 710443 | 6/1954 |
| JP | 1109189 A | 4/1989 |
| TW | 294163 | 12/1996 |
| TW | 314031 | 8/1997 |
| TW | 357693 | 5/1999 |
| TW | 465550 | 11/2001 |

OTHER PUBLICATIONS

Taiwan Bicycle Source 2002-2003; Apr. 2002; 3 pages.
SR Suntour Component Products 2003; Sep. 2002; 5 pages.
MicroShift Showcase Apr. 2003-2004; 1 page.

* cited by examiner

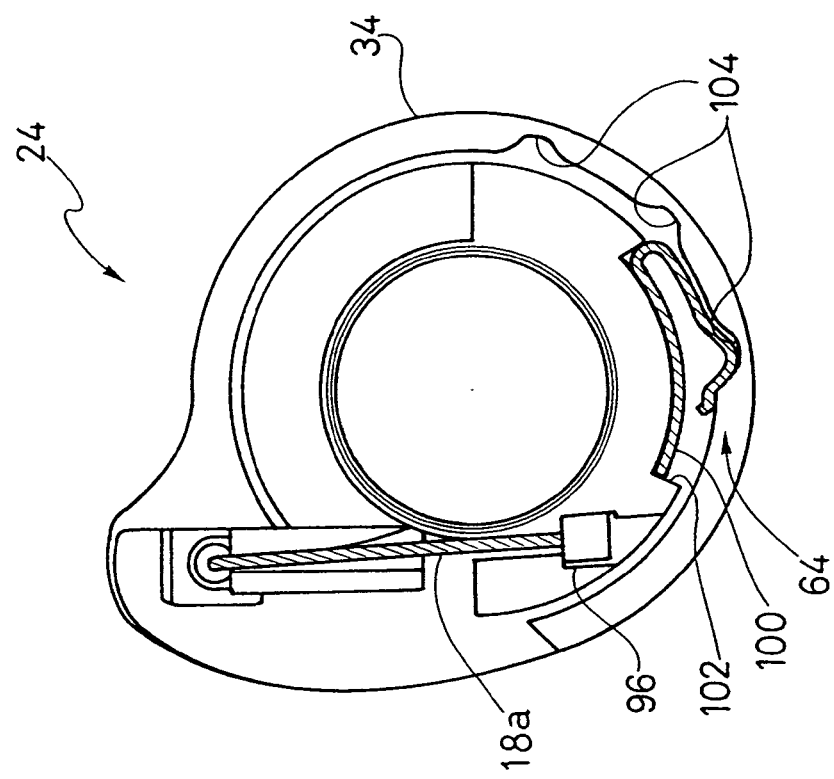
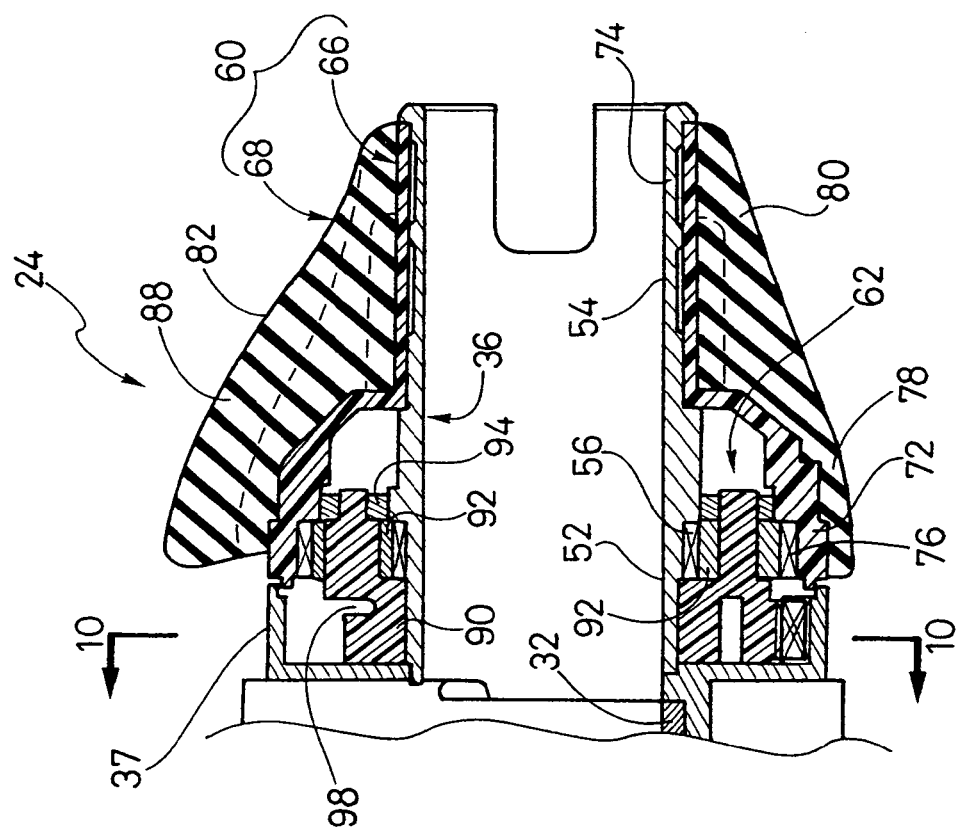
Fig. 10
Fig. 9

BICYCLE SHIFT CONTROL DEVICE

BACKGROUND OF THE INVENTION

1. Field of the Invention

This invention generally relates to a bicycle shift control device. More specifically, the present invention relates to a shift control device that provides a visual indication of at least one shift position of a rotatable shift member by a geometrically shaped visible area.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the transmission of the bicycle. Bicycle control devices for braking and/or shifting have been extensively redesigned in recent years.

Typically, shift control devices are attached to the handlebar and/or frame of the bicycle. Each shift control device controlled one derailleur or transmission device. More recently, control devices have been developed that combine both a braking and a shifting function into a single unit for controlling one brake device and one derailleur with each hand. These more recent control devices are usually mounted to opposite ends of the handlebar. Also, recent shift control devices are often provided with an indicating mechanism that notifies the rider of the current shift position. In any event, each shifter typically includes a lever (or levers) or a rotatable member configured to wind/unwind a take-up element to control lateral movement of a derailleur.

These shift control devices typically require the rider to use both hands to properly control the shifting functions of the front and rear derailleurs or a pair of transmission devices. This can be inconvenient for the rider. Additionally, the rider usually has to look back and forth between the indicators of the shift control devices to determine the current gear positions such as front and rear gear positions. This can also be inconvenient for the rider. Moreover, these typical shift control devices can be relatively complicated, especially when provided with indicator mechanisms. Thus, these typical shift control devices can be somewhat difficult and expensive to manufacture and assemble, and can be relatively heavy. Furthermore, because two shift control devices are needed, the weight of the bicycle is further increased. Finally, when rotatable shifters are utilized in these typical shift control devices, the rotatable members can be uncomfortable for the rider to grasp and to rotate back and forth while riding.

In view of the above, it will be apparent to those skilled in the art from this disclosure that there exists a need for an improved bicycle shift control device that overcomes the problems in the prior art. This invention addresses this need in the art as well as other needs, which will become apparent to those skilled in the art from this disclosure.

SUMMARY OF THE INVENTION

One object of the present invention is to provide a bicycle shift control device that has a visual indication of at least one shift position of a rotatable shift member.

Another object of the present invention is to provide an integrated bicycle shift control device that controls a pair of bicycle transmission devices.

Still another object of the present invention is to provide a bicycle shift control device that is relatively simple and inexpensive to manufacture and assemble.

The foregoing objects can basically be attained by providing a bicycle shift control device that comprises a fixed member and a rotatable member. The fixed member is adapted to be fixedly coupled to a bicycle handlebar adjacent a hand gripping area of the handlebar, the hand gripping area having a center longitudinal axis. The rotatable member is rotatably coupled to the fixed member for rotation around the handlebar between at least two shift positions. One of the fixed and rotatable members has a visible fixed contoured line and the other of the fixed and rotatable members has a visible movable contoured line adjacent the visible fixed contoured line, the visible fixed and movable contoured lines cooperating with each other to define a geometrically shaped visible area located between them. The geometrically shaped visible area is configured to change upon rotation of the rotatable member between the shift positions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 9 is an enlarged, partial cross-sectional view of the rotatable shift member/mechanism (i.e., a first shifter) of the shift control device illustrated in FIGS. 1–8, as seen along section line 9—9 of FIG. 3;

FIG. 10 is a partial, longitudinal cross-sectional view of the rotatable shift member/mechanism illustrated in FIG. 9, as seen along section line 10—10 of FIG. 9;

DETAILED DESCRIPTION OF THE PREFERRED EMBODIMENTS

A selected embodiment of the present invention will now be explained with reference to the drawings. It will be apparent to those skilled in the art from this disclosure that the following description of the selected embodiment of the present invention is provided for illustration only and not for the purpose of limiting the invention as defined by the appended claims and their equivalents.

Figure 1:
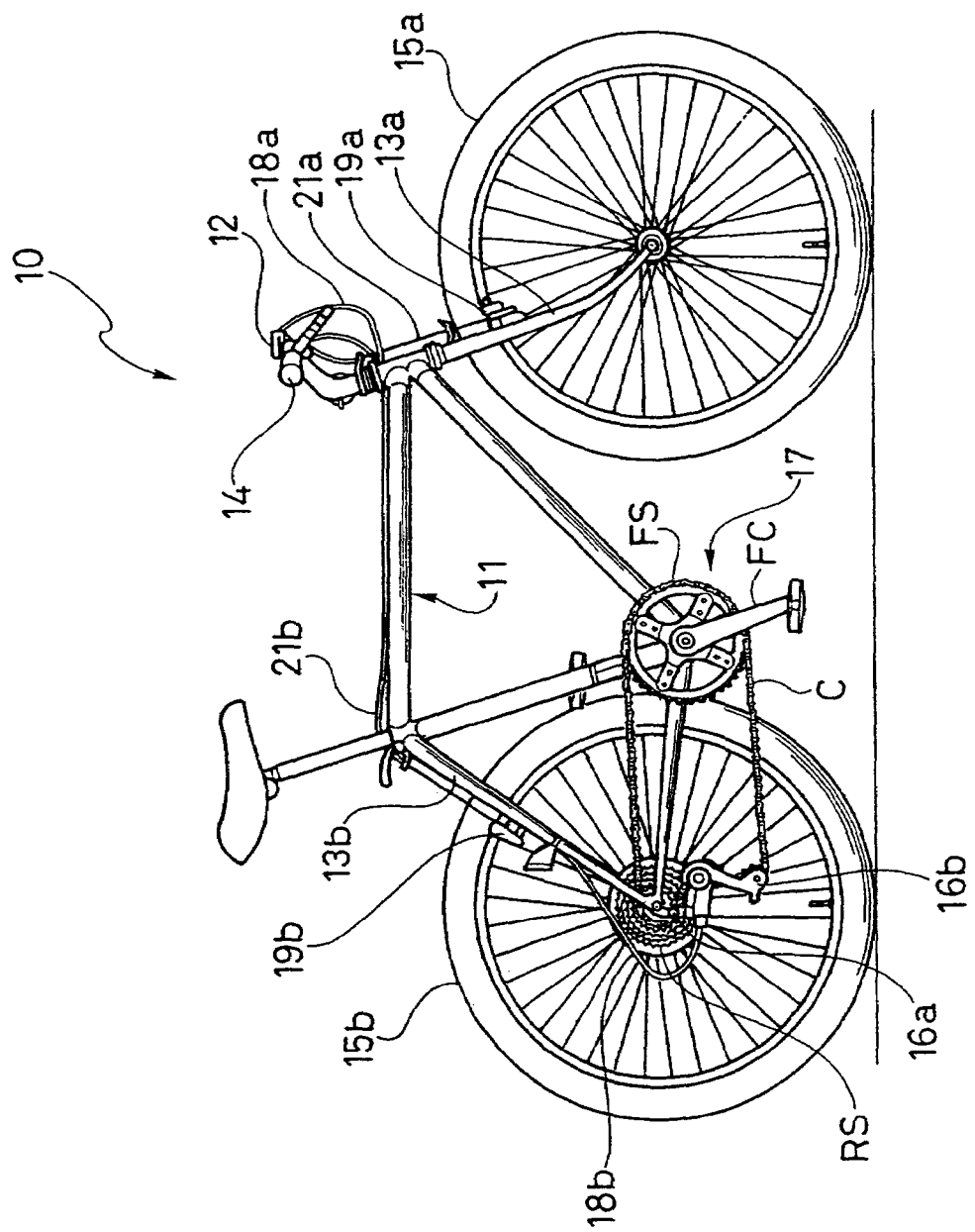
FIG. 1 is a side elevational view of a bicycle with a shift control device coupled to the handlebar in accordance with the present invention.
Figure 2:
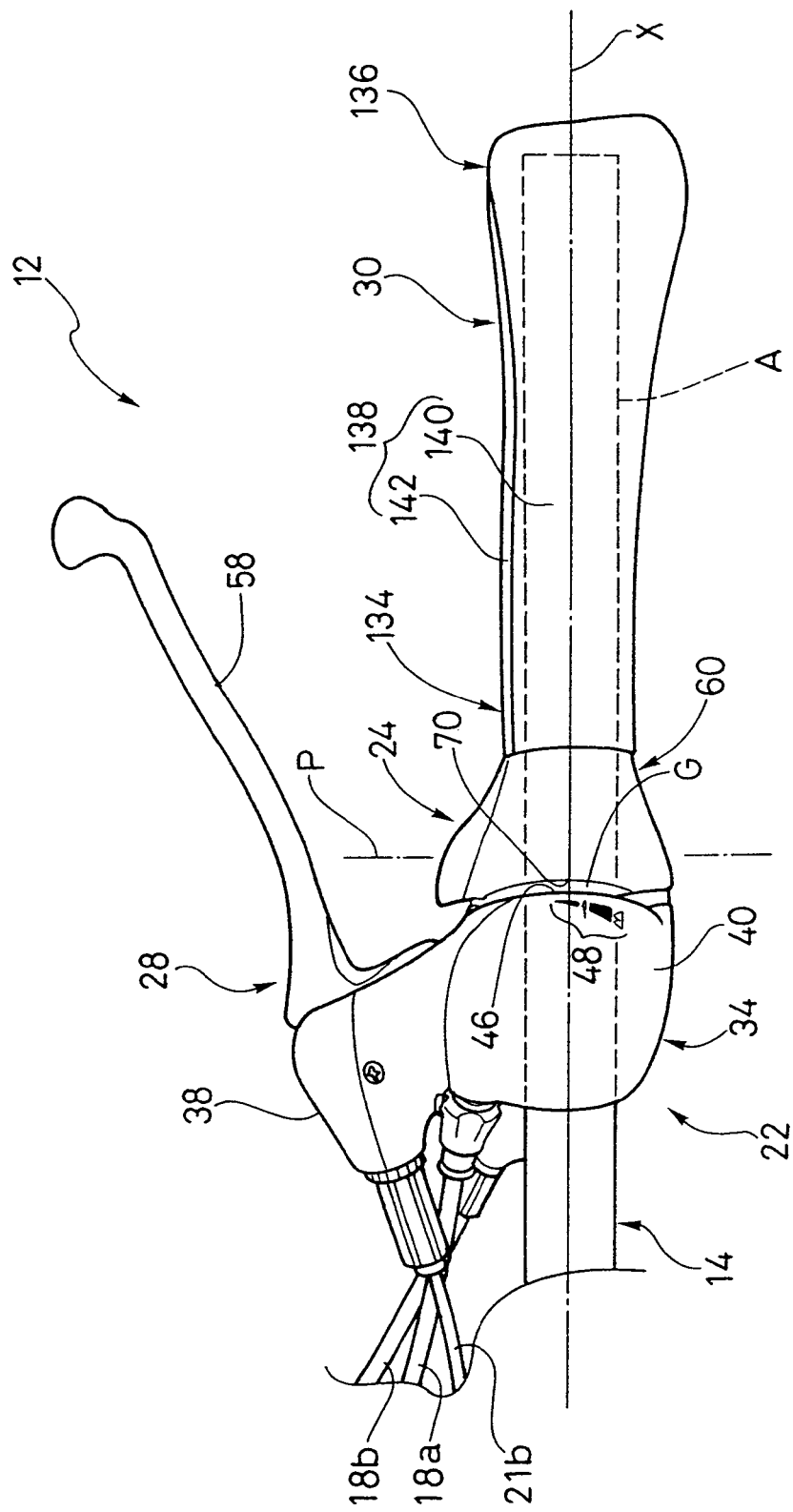
FIG. 2 is an enlarged, top plan view of the shift control device and a portion of the handlebar illustrated in FIG. 1.

Referring initially to FIG. 1, a bicycle 10 is illustrated with a bicycle control device 12 in accordance with the present invention. The bicycle 10 basically includes a frame 11 with front and rear forks 13a and 13b coupled thereto, front and rear wheels 15a and 15b coupled to the forks 13a and 13b, respectively, a drive train 17, the control device 12 and front and rear brake devices 19a and 19b. The front fork 13a is movably coupled to the frame 11, while the rear fork 13b is fixedly coupled with the frame 11. A handlebar 14 is coupled to the front fork 13a to steer the bicycle 10 via the front wheel 15a. The handlebar 14 has a hand gripping area A with a center longitudinal axis X. The control device 12 is coupled to the handlebar 14 adjacent the hand gripping area A. In the illustrated embodiment, the bicycle control device 12 is a shift/brake control device that is configured to control the rear brake device 19b and parts of the bicycle drive train or transmission 17.

More specifically, the bicycle drive train 17 preferably includes an internal hub transmission device 16a (i.e. a first bicycle transmission device) coupled to the rear wheel 15b and a rear derailleur 16b (i.e. a second bicycle transmission device) coupled to the rear fork 13b in accordance with the present invention. The internal hub transmission device 16a has three shift positions corresponding to three internal gear ratios in a conventional manner. Examples of internal hub transmission devices are sold by Shimano Inc. under the NEXUS ™ line of internally geared rear hubs. The rear derailleur 16b is arranged to move a chain C laterally over a plurality of external gears or rear sprockets RS that are coupled to the rear wheel 15b by a freewheel mechanism and the internal hub transmission device 16a in a conventional manner. A front sprocket FS is fixedly coupled to a front crank FC that is rotatably coupled to the frame 11 in order to drive the chain C. The control device 12 is designed to control both the internal hub transmission device 16a and the rear derailleur 16b. In other words, the bicycle control device 12 is designed to control two transmission devices of the bicycle drive train 17 in addition to the brake device 19b. Preferably, an additional conventional brake control device (not shown) is coupled to the opposite end of the handlebar 14 from the control device 12 in order to control the front brake device 19a.

The control device 12 is operatively coupled to the internal hub transmission device 16a and the rear derailleur 16b via first and second shift control cables 118a and 18b, respectively in order to control the gear ratio of the internal hub transmission device 16a and lateral movement of the rear derailleur 16b, respectively. Alternatively, the control device 12 could be coupled to a conventional front derailleur (not shown) instead of the internal hub transmission device 16a, such that the front derailleur is moved laterally relative to the bicycle between front sprockets in a conventional manner.

The shift cables 18a and 18b are conventional Bowden type cables with each having an outer sleeve and an inner wire. The front and rear brake devices 19a and 19b are preferably conventional. The front and rear brake devices 19a and 19b are preferably coupled to the front and rear forks 13a and 13b of the frame 11, respectively. A front brake control cable 21a is preferably coupled between the brake device 19a and the additional conventional brake control device (not shown), while a rear brake control cable 21b is operatively coupled between the brake device 19b and the bicycle control device 12 of the present invention. Thus, the bicycle control device 12 of the present invention is an integrated bicycle control device that preferably controls a pair of bicycle transmission devices (e.g., the internal hub transmission device 16a and the rear derailleur 16b) and a bicycle brake device (e.g., the rear brake device 19b). The brake cables 19a and 19b are conventional Bowden type cables with each having an outer sleeve and an inner wire.

The parts of the bicycle 10 are relatively conventional, except for the control device 12. Thus, the various parts of the bicycle 10 will not be discussed and/or illustrated in detail herein, except as related to the control device 12 of the present invention. Rather, it will be apparent to those skilled in the art from this disclosure that the parts of the bicycle 10 are conventional, except as explained and illustrated herein. Moreover, it will be apparent to those skilled in the art from this disclosure that the bicycle control device 12 of the present invention can be used with various bicycles and bicycle components as needed and/or desired.

Referring to FIGS. 2–8, the control device 12 basically includes a fixed member 22, a first shifter or shift control mechanism 24, a second shifter or shift control mechanism 26, a brake control mechanism 28 and a fixed grip portion 30. The fixed member 22 is preferably fixedly coupled to the handlebar 14 adjacent the hand gripping area A of the handlebar 14. The first and second shifters 24 and 26 are preferably movably coupled to the fixed member 22. Similarly, the brake control mechanism 28 is also preferably movably coupled to the fixed member 22. The fixed grip portion 30 is preferably fixedly coupled to the handlebar 14 at the hand gripping area A in order to support the rider's hand.

The fixed member 22 basically includes a handlebar mounting portion 32, a main housing portion 34, a tubular shifter support portion 36 and a brake lever support portion 38. The handlebar mounting portion 32 is fixedly coupled to the handlebar 14. The main housing portion 34 is fixedly coupled with the handlebar mounting portion 32. The tubular shifter support portion 36 is preferably fixedly coupled to the main housing portion 34, while the brake lever support portion 38 is preferably fixedly coupled with the main housing portion 34, as discussed below in more detail.

The handlebar mounting portion 32 is relatively conventional. Thus, the handlebar mounting portion 32 is preferably constructed as a C-shaped tubular clamp with a fastener utilized to tighten the handlebar mounting portion 32 around the handlebar 14. Preferably, the handlebar mounting portion 32 is constructed of a lightweight rigid material. For example, the handlebar mounting portion 32 can be constructed of a lightweight rigid metallic material such as cast aluminum.

The main housing portion 34 is preferably non-movably fixed to the handlebar mounting portion 32, the tubular shifter support portion 36 and the brake lever support portion 38. The main housing portion 34 preferably includes at least an upper housing member 40 and a lower housing member 42 to form a substantially hollow area for coupling the second shifter 26 therein. The main housing portion 34 also preferably includes a mounting flange 44, a visible fixed contoured line 46 and a gear position indicia 48 in accordance with the present invention, as discussed below. The upper and lower housing members 40 and 42 are both preferably constructed of a lightweight rigid material such as a metallic or plastic material. One of the housing members 40 or 42 preferably has the mounting flange 44 integrally formed therewith. The second shifter 26 is coupled to the mounting flange 44. The first shifter 24 is mounted on the tubular shifter support portion 36 adjacent the main housing portion 34, the visible fixed contoured line 46 and the gear position indicia 48, as explained below.

The main housing portion 34 can be relatively conventional, as illustrated, except that the main housing portion 34 includes the visible fixed contoured line 46 and the gear position indicia 48, and has two shifters or shift mechanisms coupled thereto (i.e., the shifters 24 and 26). Accordingly, it will be apparent to those skilled in the art from this disclosure that the main housing portion 34 could have other structures (i.e., include additional/fewer members/structures) as needed and/or desired. In any case, the main housing portion 34 is configured to support both the first and second shifters 24 and 26 in accordance with the present invention, as explained herein. The main housing portion 34 will not be discussed and/or illustrated in detail herein, except as related to the present invention.

Figure 3:
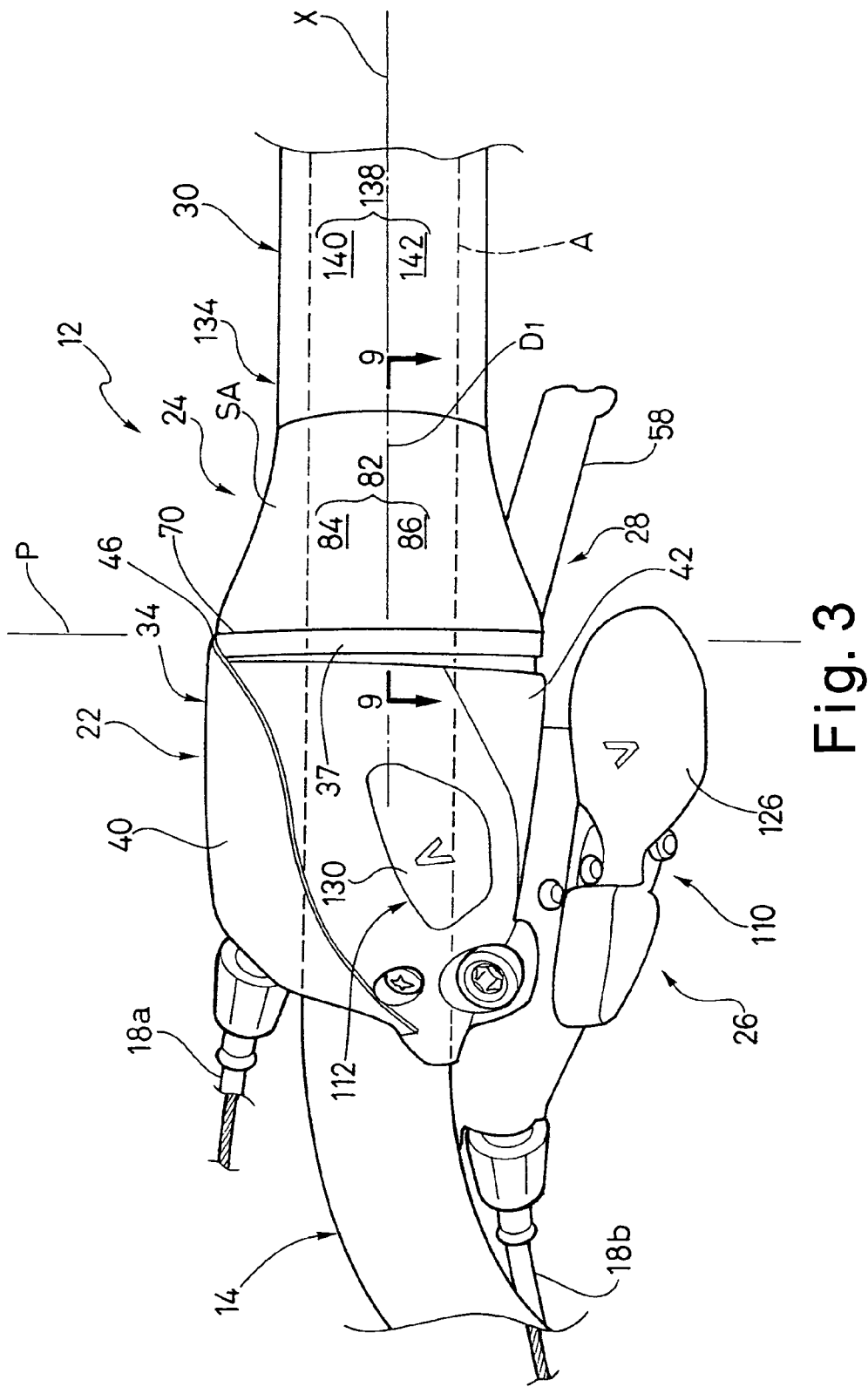
FIG. 3 is a further enlarged, rear elevational view of the shift control device and the portion of the handlebar illustrated in FIG. 2.

The upper housing member 40 of the main housing portion 34 is preferably cup-shaped, and includes the visible fixed contoured line 46 in accordance with the present invention. Preferably, the visible fixed contoured line 46 is formed as a free edge of the upper mounting member 40 as best seen in FIGS. 3–7. The visible fixed contoured line 46 partially overlaps the first shifter 24, as best seen in FIG. 3. In other words, part of the first shifter 24 is received in an axially recessed area of the fixed member 22 that is formed by the visible fixed contoured line 46 (i.e., the free edge of the upper plate 40 of the main housing portion 34 that extends axially outwardly from the main housing portion 34).

Figure 4:
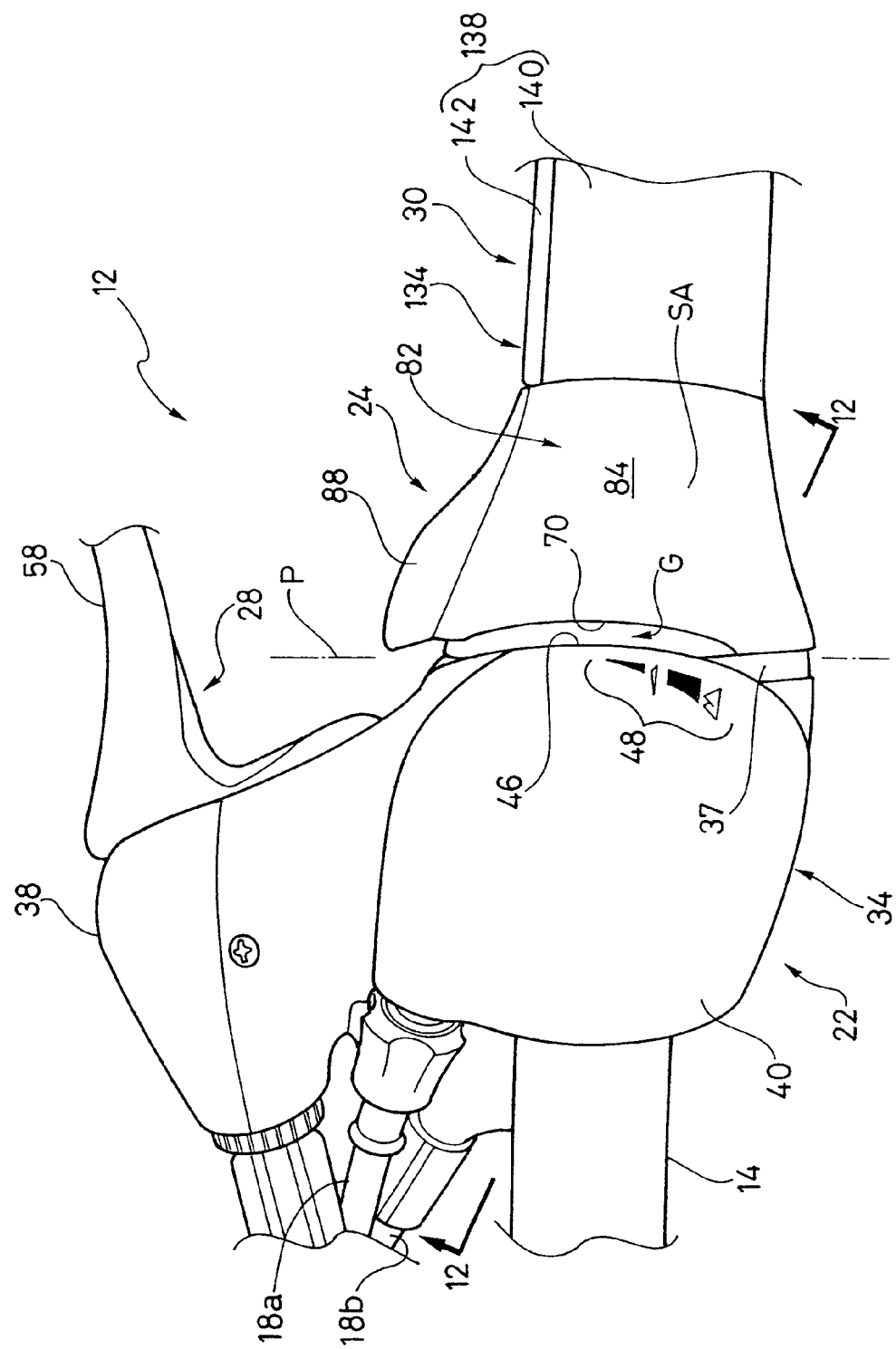
FIG. 4 is a further enlarged, top plan view of the shift control device and the portion of the handlebar illustrated in FIG. 2, with the rotatable shift member located in a middle shift position.
Figure 5:
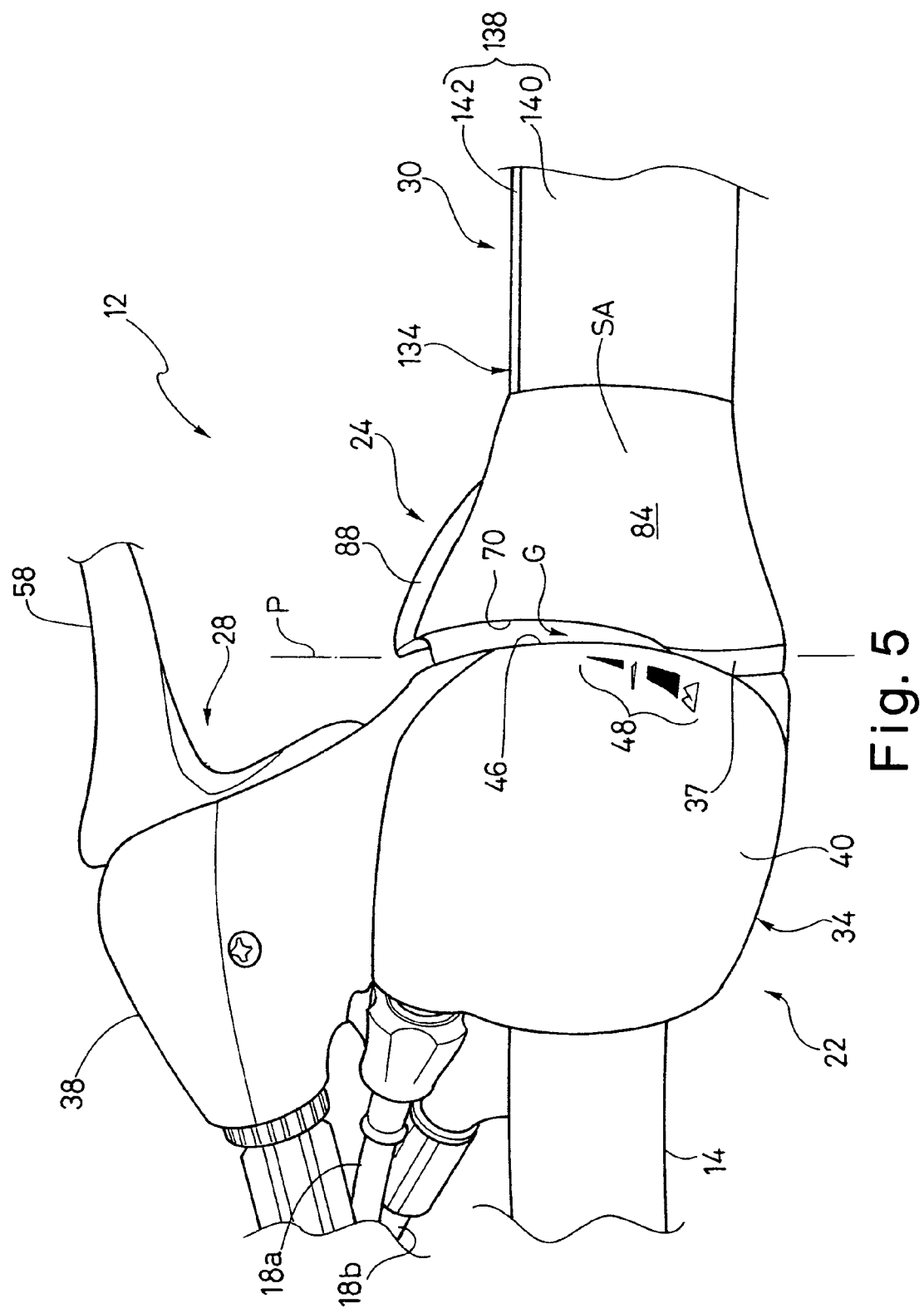
FIG. 5 is a further enlarged, top plan view of the shift control device and the portion of the handlebar illustrated in FIG. 2, with the rotatable shift member located in the forward most (Low) shift position.
Figure 6:
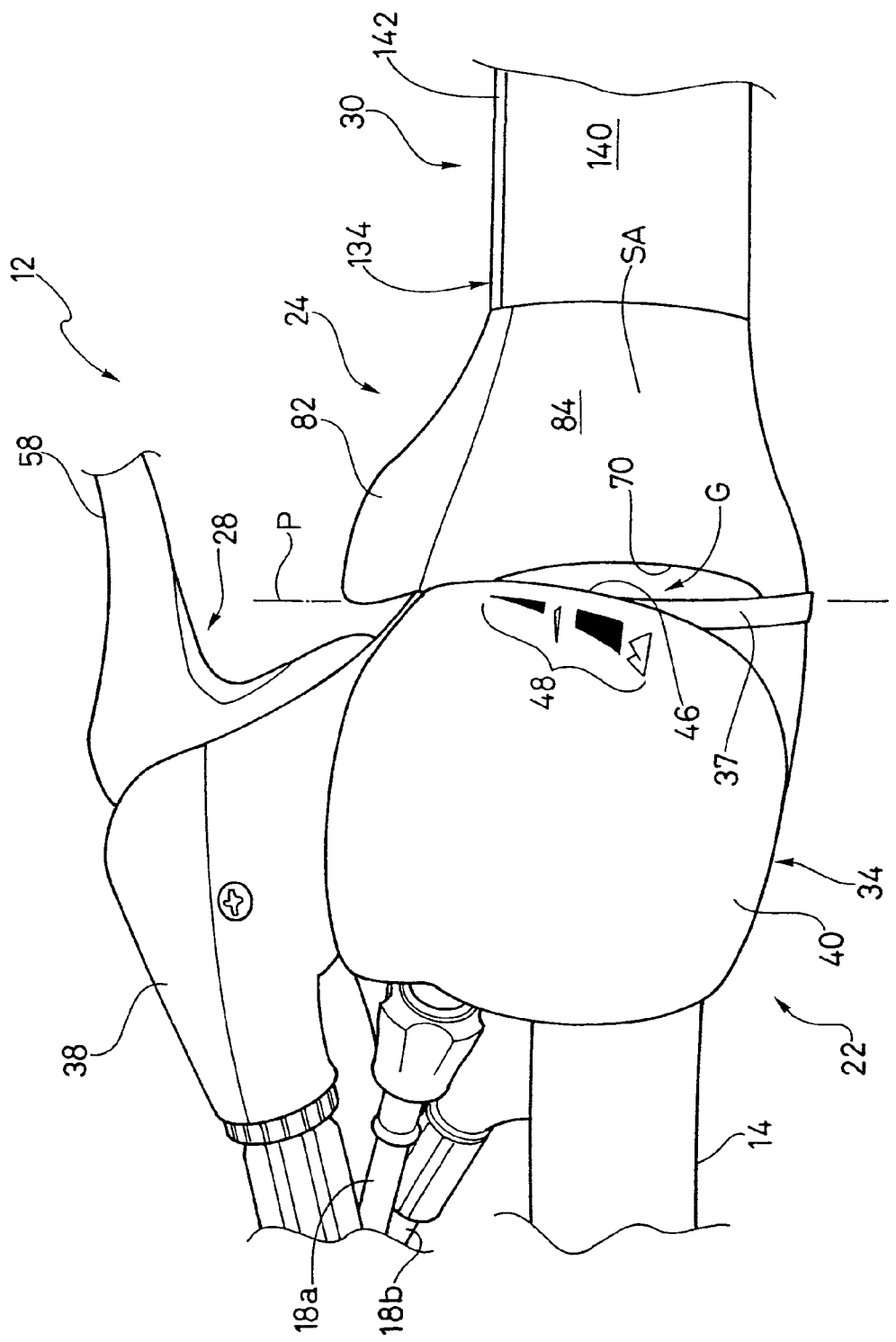
FIG. 6 is a further enlarged, top plan view of the shift control device and the portion of the handlebar illustrated in FIG. 2, with the rotatable shift member located in the rearward most (High) shift position.

Preferably, the visible fixed contoured line 46 is a convex curved line that can be slanted slightly relative to a plane P perpendicular to the center axis X of the hand gripping area A as best seen in FIGS. 4–6. Since the visible fixed contoured line 46 is part of the fixed member 22, the visible fixed contoured line 46 is preferably non-movably relative to the handlebar 14. The gear position indicia 48 is located adjacent the visible fixed contoured line 46 to identify a rotational direction of the different shift positions. In particular, the gear position indicia 48 identifies three shift positions of the first shifter 24, e.g., a forward most shift position, a rearward most shift position and a middle shift position.

The visible fixed contoured line 46 cooperates with the first shifter 24 to form a geometrically shaped visible area G, as best seen in FIGS. 4–6. The shape of the geometrically shaped visible area G provides a visual indication of the location of the first shifter 24, e.g., a forward most shift position, a rearward most shift position and a middle shift position, as discussed below in more detail. More specifically, the geometrically shaped visible area G preferably forms at least one predetermined shape when the first shifter 24 is in at least one predetermined position (i.e., the middle shift position of FIG. 4). Thus, the gear position indicia 48 identifies rotational directions of at least two gear positions (i.e., the other two shift positions that are forward/rearward of the middle shift position) when the first shifter 24 is in the middle shift position, as explained below in more detail. The geometrically shaped visible area G will also be discussed in more detail below.

The lower housing member 42 is preferably formed as a separate member from the upper housing member 40. The lower housing member 42 is cup-shaped to form an area for receiving the parts of the second shifter 26 together with the upper housing member 40 in a conventional manner. The upper and lower housing members 40 and 42 together are configured to form a pair of cable receiving openings for coupling the first and second shift cables 18a and 18b therein in order to operatively couple the first and second shifters 24 and 26 to the internal hub transmission device 16a and the rear derailleur 16b, respectively.

Referring to FIGS. 2–9, the tubular shifter support portion 36 is preferably fixedly coupled to the main housing portion 34. The tubular shifter support portion 36 is designed to have the first shifter 24 rotatably mounted thereto. Specifically, the tubular shifter support portion 36 includes an axially inner section 52 and an axially outer section 54, as best seen in FIG. 9. The tubular shifter support portion 36 is substantially cylindrically shaped and designed to be mounted on the handlebar 14 adjacent the hand gripping area A. The tubular shifter support portion 36 is preferably snap-fitted to the main housing portion 34 prior to mounting the control device 12 on the handlebar 14. The tubular shifter support portion 36 is preferably constructed of a lightweight rigid material such as a metallic material or a plastic material.

The axially inner and outer sections 52 and 54 are designed to rotatably support parts of the first shifter 24. Specifically, the inner section 52 includes a sun gear 56 fixedly coupled therewith. Preferably, the sun gear 56 is integrally formed with the tubular shifter support portion 36. The functions of the parts of the tubular shifter support portion 36 will be discussed in more detail below with reference to the first shifter 24.

The brake lever support portion 38 extends from the main housing portion 34. The brake lever support portion 38 is fixedly coupled with the handlebar mounting portion 32, the main housing portion 34 and the tubular shifter support portion 36 to form the fixed member 22 of the control device 12. The brake lever support portion 38 has a brake lever 58 pivotally mounted thereto in a conventional manner. The brake lever support portion 38 has an opening for receiving the brake control cable 21b in order to operatively couple the brake lever 58 to the rear brake device 19b. The brake lever 58 is mounted on a pivot pin and is normally biased by a biasing member in a conventional manner to form the brake control mechanism 28 of the control device 12.

Referring now to FIGS. 2–11, the first (rotatable) shifter or shift control mechanism 24 will now be discussed in more detail. The first shifter 24 basically includes a rotatable member 60 in accordance with the present invention, a winding member 62 and an indexing or positioning mechanism 64. The first shifter 24 operates substantially in accordance with U.S. Patent Publication No. US 2002/0128112. Accordingly, the operation of the first shifter 24 will not be discussed and/or illustrated in detail herein, except as related to the present invention. Basically, the rotatable member 60 is rotatably mounted on the tubular shifter support portion 36 of the fixed member 22. The winding member 62 is operatively coupled to the rotatable member 60 to selectively wind and unwind the first shift control cable 18a in order to control the internal hub transmission device 16a. The positioning mechanism 64 is operatively coupled between the main housing portion 34 of the fixed member 22 and the winding member 62 to selectively retain the winding member 62 and the rotatable member 60 in each of the three shift positions.

The rotatable member 60 of the present invention basically includes a base element 66, a cover 68 and a visible movable contoured line 70 in accordance with the present invention. The cover 68 is preferably fixedly coupled with the base element 66 to rotate therewith. The base element 66 is preferably constructed of a more rigid material than the cover 68, as discussed below in more detail. Moreover, the base element 66 is preferably a different color than the cover 68. In the preferred embodiment, the base element is preferably constructed of black colored plastic material. Preferably, an intersection line between the base element 66 and the cover 68 defines the visible movable contoured line 70, as explained below. The base element 66 is rotatably mounted on the tubular shifter support portion 36 of the fixed member 22. The winding member 62 is operatively coupled between the base element 66 and the tubular shifter support portion 36 via a gear system, which is discussed below.

The base element 66 is a tubular member axially mounted on the tubular shifter support portion 36 to rotate around the handlebar 14. The base element 66 includes an inner support section 72 and an outer support section 74. The outer support section 74 is directly rotatably mounted on outer section 54 of the tubular shifter support portion 36 of the fixed member 22. The inner support section 72 of the base element 66 is indirectly rotatably mounted on the inner section 52 of the shifter support portion 36 via the winding member 62 (i.e., the gear system). The inner support section 72 has a larger diameter than the outer support section 74 in order to accommodate the winding member 62. Additionally, the inner support section 72 includes a ring gear 76 designed to engage with parts of the winding member 62 (i.e., the gear system), as discussed below in more detail. The base element 66 is preferably constructed of a hard rigid plastic material that is more rigid than the material(s) of the cover 68.

Figure 7:
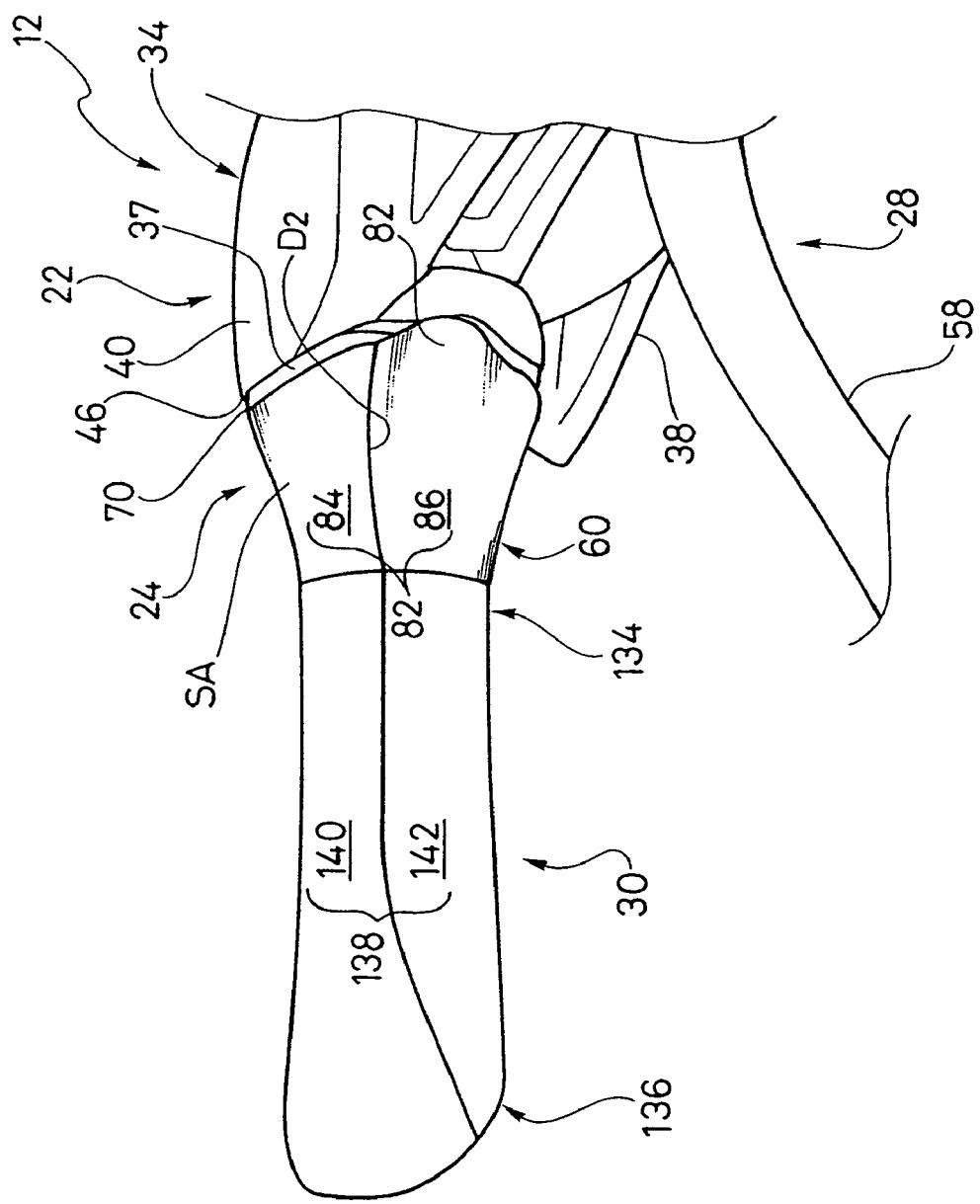
FIG. 7 is a partial front perspective view of the shift control device and the portion of the handlebar illustrated in FIGS. 2–6.
Figure 8:
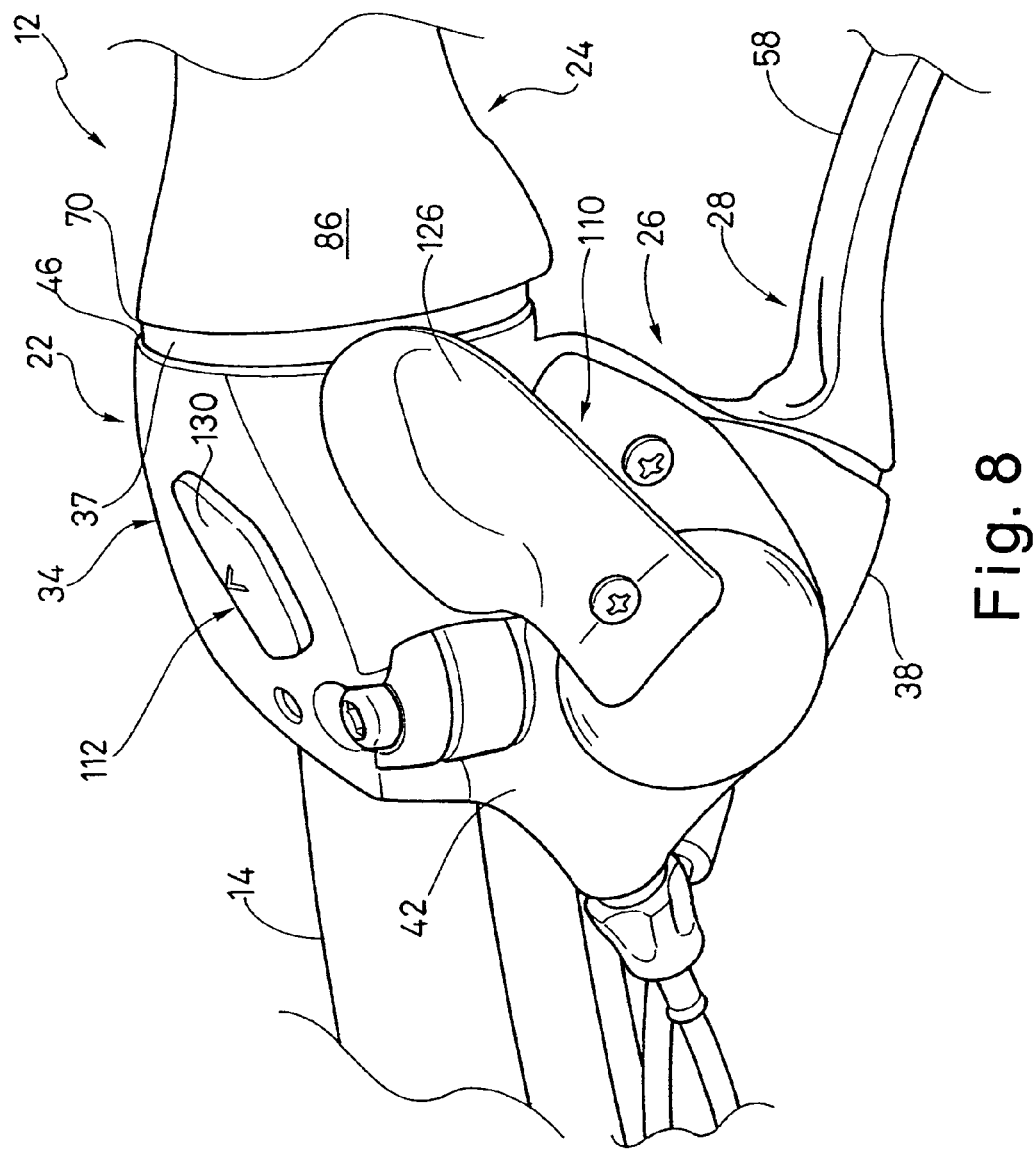
FIG. 8 is a partial bottom perspective view of the shift control device and the portion of the handlebar illustrated in FIGS. 2–6.
Figure 12:
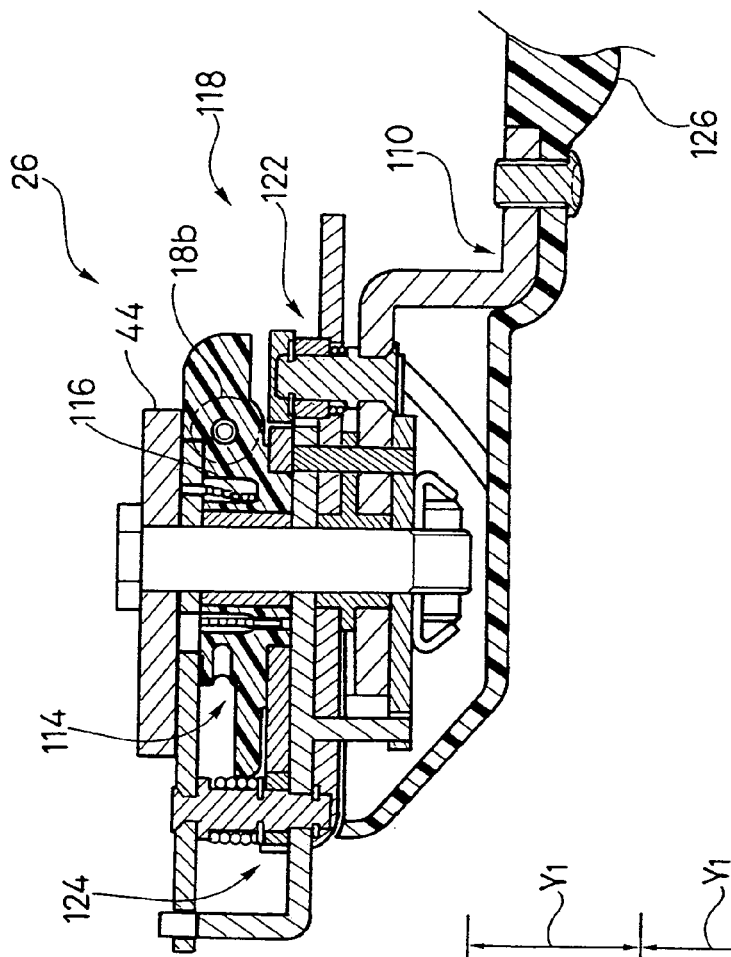
FIG. 12 is a partial, cross-sectional view of an additional shifting mechanism (i.e., a second shifter) of the shift control device illustrated in FIGS. 1–10, as seen along section line 12—12 of FIG. 4.

The cover 68 basically includes an inner end 78, an outer end 80 and an actuating surface 82 extending between the inner and outer ends 78 and 80. The cover 68 is preferably constructed as a one-piece member of two different elastomeric materials. The two different elastomeric materials of the cover 68 have different rigidities and are preferably different colors. The two different elastomeric materials extend longitudinally and are divided from each other by a pair of longitudinally extending dividing lines $D_1$ and $D_2$ as best seen in FIGS. 3 and 7. The cover 68 is preferably fixedly coupled to the outer surface of the base element 66.

The actuating surface 82 of the cover 68 includes a first portion 84 constructed of a first elastomeric material and a second portion 86 constructed of a second elastomeric material that is more rigid than the first elastomeric material. The first and second portions 84 and 86 extend substantially in the axial direction of the cover 68. Preferably, the first material of the first portion 84 is a light gray color, while the second material of the second portion 86 is a darker gray color than the light gray color of the first material. Of course, any two contrasting colors can be used for the first and second portions 84 and 86. The second portion 86 of the actuating surface 82 includes a finger operating projection 88.

The first portion 84 and the second portion 86 with the finger operating projection 88 of the actuating surface 82 define a tubular hand grip of the actuating surface 82 with the finger operating projection 88 extending outwardly relative to the remainder of the tubular hand grip. The tubular hand grip has a substantially conical shape, except for the finger operating projection 88, that tapers from the inner axial end 78 toward the center longitudinal axis X of the hand gripping area A as the actuating surface 82 approaches the outer axial end 80 of the cover 68. The finger operating projection 88 extends outwardly from the tubular hand grip by a predetermined radial distance larger than a remainder of the tubular hand grip in order to decrease an operating force necessary to rotate the rotatable member 60 around the handlebar 14.

The finger operating projection 88 also tapers from the inner axial end 78 of the cover 68 toward the center longitudinal axis X of the hand gripping area A as the finger operating projection 88 approaches the outer axial end 80 of the cover 68. Thus, the actuating surface 82 of the cover 68 has an overall tapered/conical shape toward the center longitudinal axis X of the hand gripping area A as the actuating surface 82 extends toward the outer end 80 of the cover 68, with the finger operating projection extending to an overall maximum outer radial dimension of the actuating surface 82 as measured from the center longitudinal axis X relative to the remainder of the actuating surface 82.

The finger operating projection 88 is arranged on a substantially forward side of the center longitudinal axis X of the hand gripping area A when the handlebar 14 is coupled to the bicycle frame 11 and arranged in a normal riding position. Similarly, the first portion 84 of the actuating surface 82 includes a hand support area SA that is located substantially upwardly of the center longitudinal axis X of the hand gripping area A when the handlebar 14 is coupled to the bicycle 10 and arranged in the normal riding position. The hand support area SA is defined by the part of the first portion 84 of the actuating surface 82 that supports a part of a rider's hand during normal riding. Thus, the first portion 84 of the actuating surface 82, which is constructed of the less rigid material (i.e., the first material) is arranged to partially support the rider's hand.

Preferably less than 50% of the actuating surface 82 constructed of the first, less rigid material. Also, preferably less than 50% of the entire cover 68 is constructed of the first, less rigid material. In other words, the first portion 84 of the actuating surface 82 preferably extends less than one-hundred-eighty degrees in the circumferential direction relative to the center longitudinal axis X of the hand gripping area A, while the second portion 86 (i.e., with the finger operating projection 88) of the actuating surface 82 preferably extends more than one-hundred-eighty degrees in the circumferential direction relative to the center longitudinal axis X of the hand gripping area A. Accordingly, a majority of the cover 68 is preferably constructed of the more rigid, second material.

Figure 11:
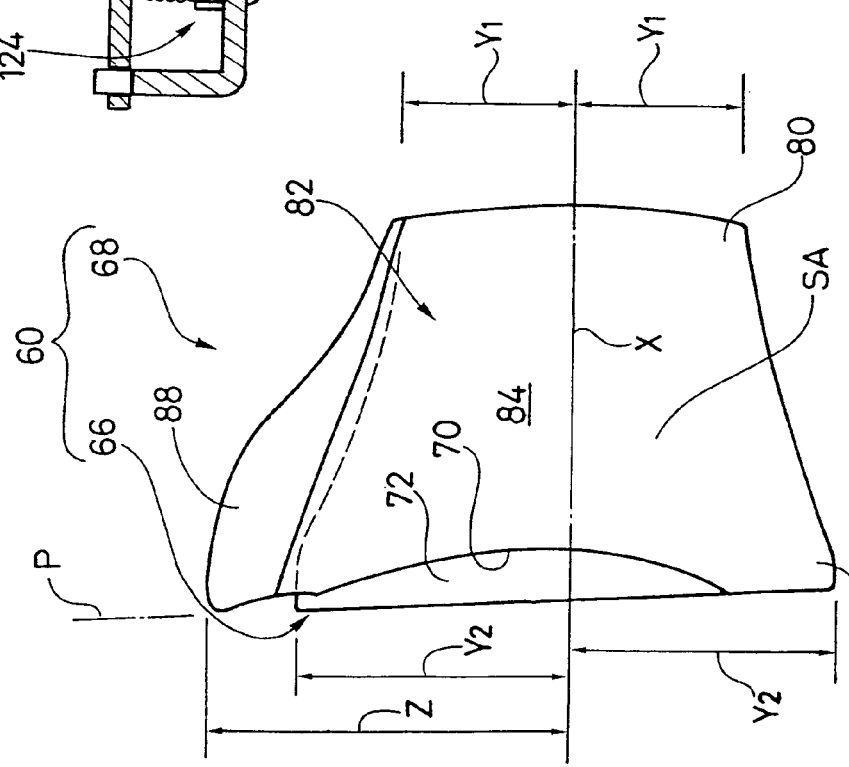
FIG. 11 is an enlarged, top plan view of the rotatable shift member of the shift control device illustrated in FIGS. 1–10.

Referring to FIG. 11, the substantially conical shaped part of the actuating surface 82 (i.e. the entire actuating surface 82 except for the finger operating projection 88) has a minimum outer radial dimension $Y_1$ and a maximum outer radial dimension $Y_2$. The finger operating projection 88 extends outwardly in a radial direction to a maximum outer radial dimension Z that is larger than the maximum outer radial dimension $Y_2$. The maximum outer radial dimension $Y_2$ is preferably about 1½ times larger than the minimum outer radial dimension $Y_1$. The maximum outer radial dimension Z is about 1⅓ times the maximum outer radial dimension $Y_2$ (i.e., about twice the minimum outer radial dimension $Y_1$). The finger operating projection 88 tapers inwardly in a radial direction to about the minimum outer radial dimension $Y_1$ or only a slightly larger radial outer dimension than the minimum outer radial dimension $Y_1$).

The visible movable contoured line 70 of the rotatable member 60 is preferably a concave line that is substantially parallel to the visible fixed contoured line 46 of the fixed member 22 when the rotatable member 60 is arranged in the middle shift position, as best seen in FIG. 4. Preferably, the visible movable contoured line 70 is defined by a change in color (i.e., contrast between light gray and black). Moreover, the visible movable contoured line 70 is preferably defined by a change in material (i.e., the intersection of the hard black plastic of the base element 66 and the first elastomeric material of the first portion 84 of the actuating surface 82). More specifically, in the illustrated embodiment, the visible movable contoured line 70 is defined by the intersection of the cover 68 with the base element 66 at the inner axial end 78 only partially overlying the inner support section 72 of the base element 66 such that a free edge of the cover 68 defines the visible movable contoured line 70. In other words, the base element 66 of the rotatable member 60 preferably extends at least partially beyond the free edge of the cover 68 toward the fixed member 22, and the free edge of the fixed member 22 that forms the visible fixed contoured line 46 partially overlaps the base element 66 of the rotatable member 60.

As mentioned above, the cover 68 is preferably integrally formed as a one-piece member of two different materials. Specifically, the cover 68 is preferably formed by using a dual injector injection molding method. Specifically, two different injectors are utilized with a mold or molds, with each injector having one of the first or second materials, in a relatively conventional manner. Because both the first and second materials are elastomeric materials, adhesion between the first and second materials is preferably achieved, at least to some degree. In other words, the first and second materials can be configured to chemically bond to each other. However, even if the first and second materials do not chemically bond to each other, the first and second materials will at least physically bond such that the cover 68 is then essentially a one-piece member. Accordingly, the term "one-piece member" includes one or more materials that are physically or chemically bonded together in a manner such that they can not be taken apart and reassembled without repairing the one-piece member.

It will be apparent to those skilled in the art from this disclosure that some mechanical coupling or anchoring such as reinforcing member could also be used in securing the first and second portions 84 and 86 (i.e., the first and second materials) together to form the one-piece cover 68. For instance, the first portion 84 could first be formed by injection molding, with anchors partially located therein and extending therefrom. Then the second portion 86 could be formed by injection molding. The second portion 86 would then surround the exposed parts of the anchors to mechanically couple the first and second portions 84 and 86 together. The second portion 86 would also at least partially adhere to the first portion 84 due to adhesive properties of the elastomeric materials. In any case, the first and second portions 84 and 86 are preferably integrally formed together as a one-piece member of two different elastomeric materials as explained above.

The visible fixed and movable contoured lines 46 and 70 cooperate with each other to define the geometrically shaped visible area G located therebetween. The geometrically shaped visible area G is a black area that is configured to change upon rotation of the rotatable member 60 between the three shift positions as best seen in FIGS. 4–6. The main housing portion 34 includes an annular black colored section 37 that extends around the handlebar 14 and partially beneath the free edge of the upper housing member 40 (i.e., the visible fixed contoured line 46). The inner support section 72 of the base element 66 is arranged adjacent the annular black colored section 37. The exposed part of the base element 66, which is not covered by the cover 68, is also a black color, as mentioned above. The visible black area (e.g., as viewed by the rider such as in FIGS. 4–6) defined by the annular black section 37 of the fixed member 22 and the visible part of the base element 66 form the geometrically shaped visible area G.

In other words, when the visible movable contoured line 70 moves as the rotatable member 60 is rotated, the geometrically shaped visible area G will change in appearance as best seen in FIGS. 4–6. When the rotatable member 60 is in the middle shift position, the geometrically shaped visible area G is shaped as shown in FIG. 4 with the visible fixed and movable contoured lines 46 and 70 being substantially parallel to each other. This unique shape of the geometrically shaped visible area G when the rotatable member 60 is in the middle shift position indicates the middle shift position of the internal hub transmission device 16a. In other words, the geometrically shaped visible area will only have the shape illustrated in FIG. 4 when the rotatable member 60 and the internal hub transmission device 16a are in the middle shift positions.

When the rotatable member 60 is located in the forward most and rearward most shift positions, the geometrically shaped visible area G will have the unique shapes illustrated in FIGS. 5 and 6, respectively. Thus, the rider can quickly and easily determine the shift position of the rotatable member 60 and the internal hub transmission device 16a by looking at the geometrically shaped visible area G, which has a unique shape in each of the three shift positions of the rotatable member 60. The gear position indicia 48 indicates which rotational direction corresponds to different shift positions. Accordingly, when the rider looks at the geometrically shaped visible area G, the rider can determine the current shift position. The rider can also look at the gear position indicia 48 and determine which rotational direction to move the rotatable member 60 to shift the internal hub transmission device 16a to the desired shift position.

The geometrically shaped visible area G gives an appearance that the rotatable member 60 can not be further rotated forward and rearward when the rotatable member 60 is in the forward most and rearward most shift positions as seen in FIGS. 5 and 6, respectively. Accordingly, the geometrically shaped visible area G gives an indication to the rider that the rotatable member 60 is in the end shift positions, respectively. Furthermore, the configuration of the geometrically shaped visible area G when the rotatable member 60 is in the end shift positions indicates to the rider how to move the rotatable member 60 (i.e., which way to rotate the rotatable member 60) back to the middle shift position, i.e., by moving the visible movable contoured line 70 toward the visible fixed contoured line 46. In any case, the geometrically shaped visible area G provides at least one unique shape when the rotatable member 60 in arranged in at least one of the three shift positions.

The winding member or mechanism 62 will now be discussed in more detail with reference to FIGS. 9 and 10. The winding member 62 operates in accordance with U.S. Patent Publication No. US 2002/0128112. Accordingly, the winding member 62 will not be discussed and/or illustrated in detail herein, except as related to the present invention. The winding member 62 basically includes a take-up element 90 with a plurality of planetary gear members 92 coupled thereto via mounting pins and a retaining plate 94. The winding member 62 is rotatably supported by the tubular shifter support portion 36 via the planetary gear members 92 and an inner annular surface of the take-up element 90.

The planetary gear members 92 engage the sun gear 56 of the fixed member 22 and the ring gear 76 of the rotatable member 60 such that the rotatable member 60 is operatively coupled to the take-up element 92 to rotate the take-up element 90 when the rotatable member 60 is rotated by the rider. The take-up element 90 includes a cable attachment point 96 with the shift cable 18a coupled thereto and a guide groove 98 configured to receive the inner wire of the shift cable 18a. Thus, when the rotatable member 60 is rotated by the rider, the winding member 62 can wind/unwind the inner wire of the shift cable 18a.

Referring still to FIGS. 9 and 10, the indexing/positioning mechanism 64 will now be discussed in more detail. The indexing/positioning mechanism 64 operates in accordance with U.S. Patent Publication No. US 2002/0128112. Accordingly, the indexing/positioning mechanism 64 will not be discussed and/or illustrated in detail herein, except as related to the present invention. The indexing/positioning mechanism 64 is designed to retain the rotatable member 60 and the winding member 62 in each of the three shift positions. Thus, the internal hub transmission device 16a is also retained in three shift positions that correspond to the three different gear ratios. The indexing/positioning mechanism 64 includes a positioning element 100 mounted in a recess 102 of the winding member 62 and a plurality (three) mating channels 104 formed in the main housing portion 34 of the fixed member 22.

The positioning element 100 is a resilient metal strip with a protruding portion sized to be received in each of the mating channels 104 formed in the main housing portion 34. The indexing/positioning mechanism 64 applies an effective biasing force on the winding member 62 and the rotatable member 60 large enough to prevent undesired movement of the rotatable member 60, and thus, the internal hub transmission device 16a. In other words, the positioning mechanism 64 applies an effective biasing force or retaining force larger than any biasing force of the internal hub transmission device 16a. Preferably, the positioning element 100 cooperates with the mating channels 104 to provide an audible sound and feel (i.e., a feeling of releasing the biasing force) when the rotatable member 60 is moved to each shift position.

Referring now to FIGS. 4 and 12–20, the second shifter or shifting mechanism 26 will now be discussed in more detail. The second shifter or shifting mechanism is constructed substantially in accordance with U.S. patent application Ser. No. 10/041,557, except the first and second shift elements 110 and 112 are modified versions of the shift levers/buttons illustrated in U.S. patent application Ser. No. 10/041,557. Accordingly, the second shifter 26 will not be discussed and/or illustrated in detail herein, except as related to the present invention. The second shifter 26 basically includes a first shift element 110, a second shift element 112, a winding member 114, a biasing member 116 and an indexing/positioning mechanism 118.

The winding member 114 is basically a take-up element that includes a cable attachment point and a winding surface. The first and second shift elements 110 and 112 are operatively coupled to the winding member via the indexing/positioning mechanism 118 to wind or unwind the winding member 114 to pull/release the second shift control cable 18b to control movement of the rear derailleur 16b. The biasing member 116 normally biases the winding member 114 in a predetermined rotational direction. The first and second shift elements 110 and 112 will be explained below.

The positioning mechanism 118 basically includes a ratchet member 120, a winding pawl 122 and a retaining member 124. The ratchet member 120 normally rotates with the winding member 114. The ratchet member 120 is non-movably coupled to the winding member 114. The ratchet member 120 includes a plurality of recesses designed to engage the winding pawl 122 and a plurality of teeth/troughs designed to engage the retaining member 124. The winding pawl 122 is coupled to the first shift element 110 and is normally biased toward the ratchet member 120, as seen in FIGS. 13–16. Thus, when the rider pushes the first shift element 110 the winding pawl 122 engages the ratchet member 120 to rotate the winding member 114. In an end shift position (FIG. 13), the winding pawl 122 also acts to hold the ratchet member 120.

Figure 14:
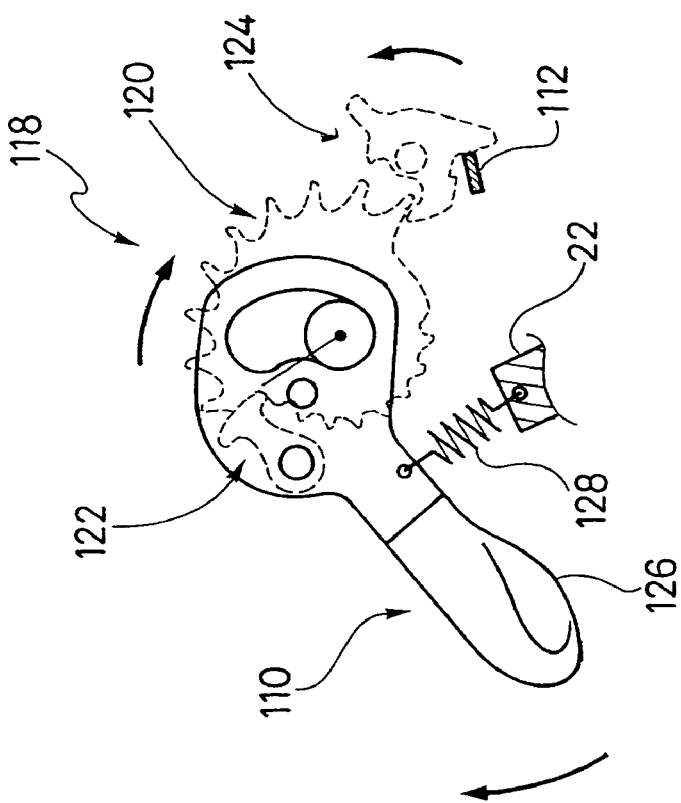
FIG. 14 is a partial, bottom plan view of the additional shifting mechanism illustrated in FIG. 12 during initial movement of the first shift element and winding pawl in the clockwise direction, with the moving directions of the first shift element, the ratchet member and the retaining member shown with arrows.
Figure 13:
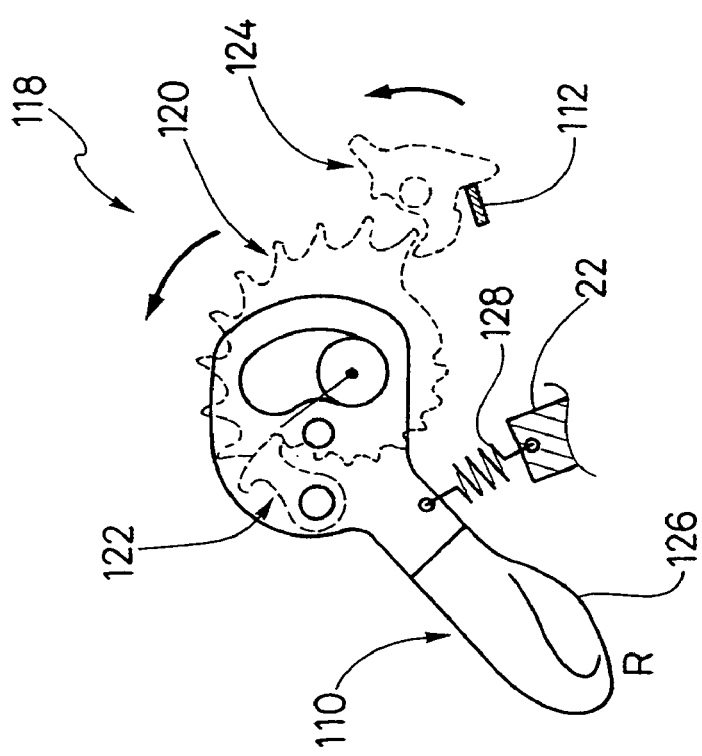
FIG. 13 is a partial, bottom plan view of the additional shifting mechanism illustrated in FIG. 12, with the first shift element in a rest position R and with the biased directions of the ratchet member and the retaining member shown with arrows.
Figure 16:
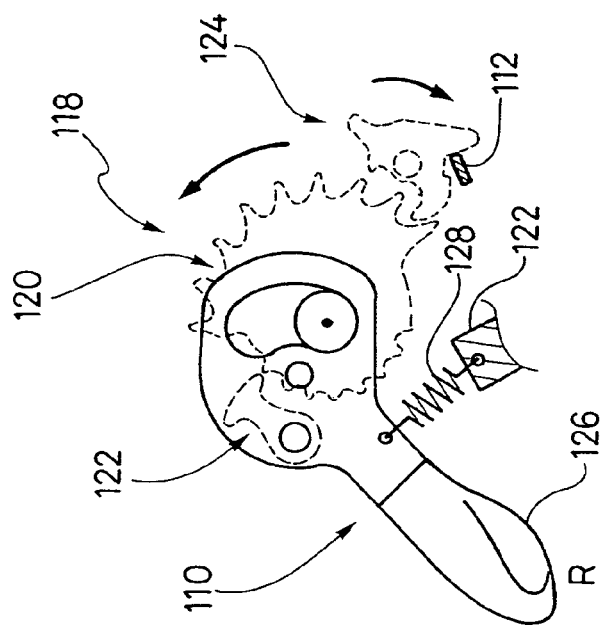
FIG. 16 is a partial, bottom plan view of the additional shifting mechanism illustrated in FIG. 12 after movement of the first shift element and winding pawl back in the counter-clockwise direction to the rest position R, with the biasing directions of the ratchet member and the retaining member shown with arrows.
Figure 15:
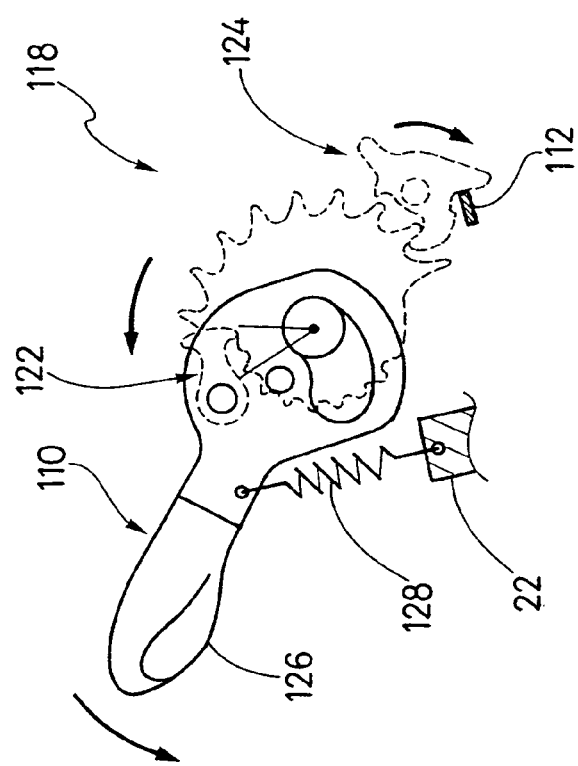
FIG. 15 is a partial, bottom plan view of the additional shifting mechanism illustrated in FIG. 12 after moving the first shift element and winding pawl in the clockwise direction, with the biasing directions of the first shift element, ratchet member and the retaining member shown with arrows.
Figure 18:
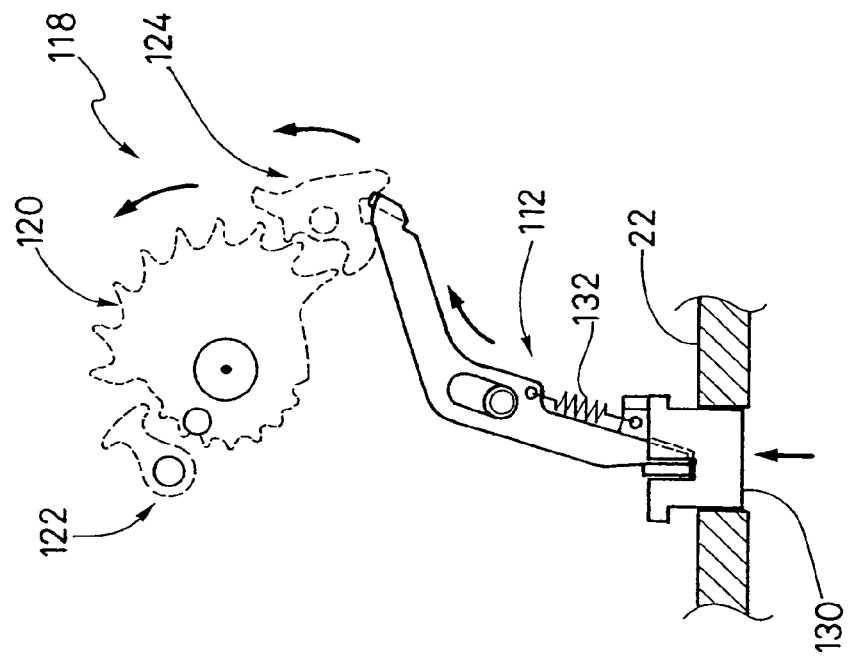
FIG. 18 is a partial, bottom plan view of the additional shifting mechanism illustrated in FIG. 12 after movement of the second shift element and retaining member, with the moving directions (also the biasing direction of the ratchet member) of the second shift element, the ratchet member and the retaining member shown with arrows.
Figure 17:
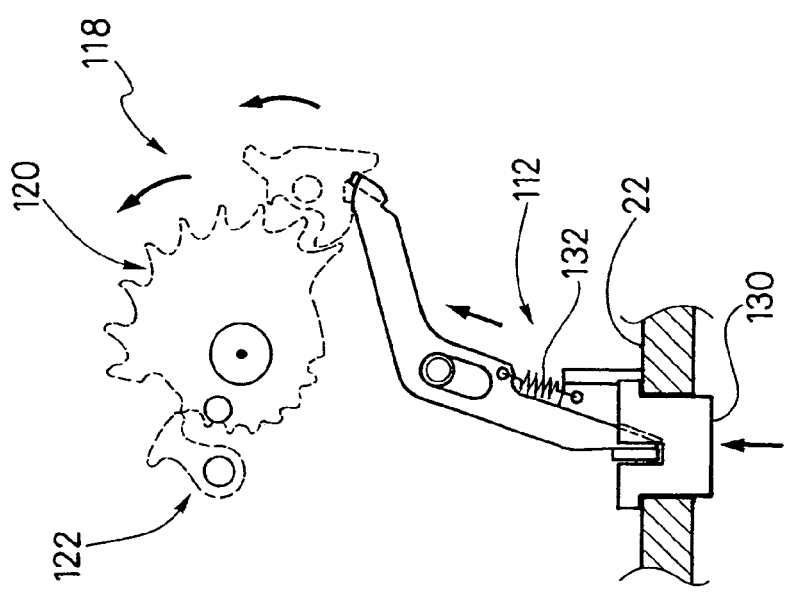
FIG. 17 is a partial, bottom plan view of the additional shifting mechanism illustrated in FIG. 12 during initial movement of the second shift element and retaining member, with the moving of the second shift element, the ratchet member directions (also the biasing direction of the ratchet member) and the retaining member shown with arrows.
Figure 20:
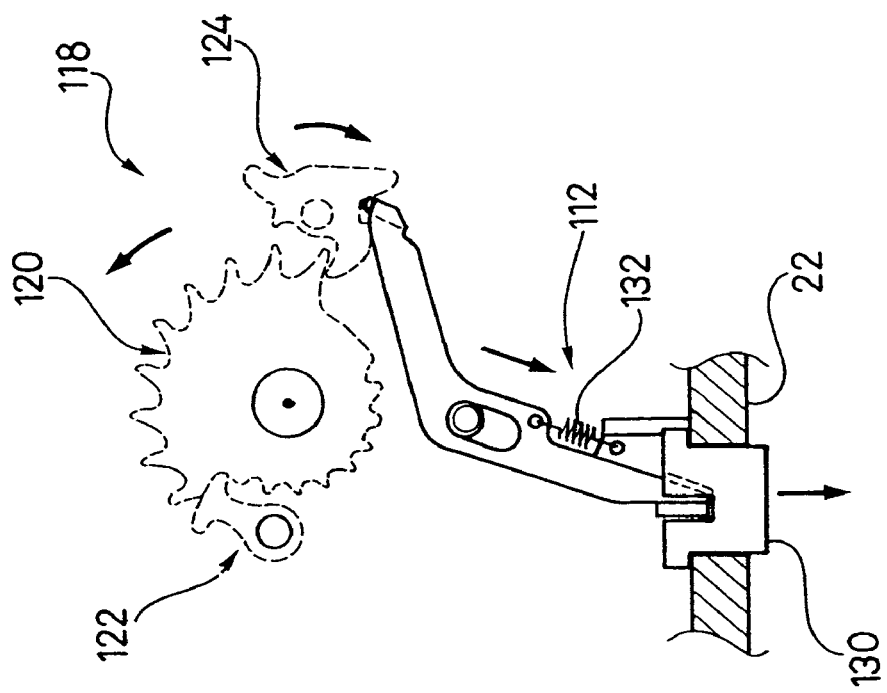
FIG. 20 is a partial, bottom plan view of the second shifting mechanism illustrated in FIG. 12 after return movement of the second shift element and the retaining member, with the biasing directions of the second shift element, the ratchet member and the retaining member shown with arrows.
Figure 19:
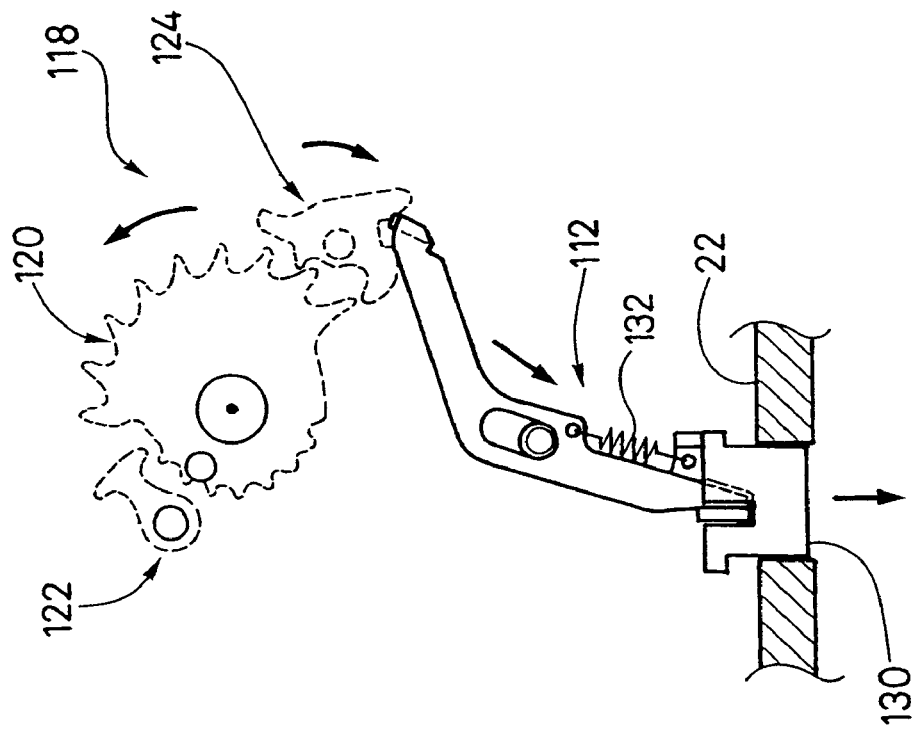
FIG. 19 is a partial, bottom plan view of the second shifting mechanism illustrated in FIG. 12 after movement of the second shift element and the retaining member, with the moving directions/biasing directions of the second shift element, the ratchet member and the retaining member shown with arrows.

The retaining member 124 is operatively coupled to the second shift element 112 and is biased in a direction toward the ratchet member 120 (i.e., clockwise) as seen in FIGS. 13–20. The retaining member 124 allows the ratchet member 120 to rotate in a direction opposite the biasing force direction of the biasing member 116 (i.e., the clockwise direction as seen in FIGS. 14 and 15). Thus, the retaining member 124 does not prevent rotation of the ratchet member 120 when the first shift element 110 is pushed. However, the retaining member 124 prevents rotation of the ratchet member 120 in the counter-clockwise direction as seen in FIGS. 16 and 17, except when the ratchet member 120 is arranged in the end shift position of FIGS. 13, 14, 19 and 20 when the winding pawl 122 holds the ratchet member 120 against counter-clockwise rotation.

When the rider pushes the second shift element 112, the retaining member is released one shift position such that the ratchet member 120 rotates due to the biasing force of the biasing member 116 as seen in FIGS. 17–20.

The first shift element 110 is basically a pivotal shift lever with a button 126 designed to be pressed by the rider's thumb in the normal riding position. When the rider pushes the button 126 the first shift element pivots, moving the winding pawl 122, and thus the ratchet member 120. The shift element 110 is normally biased to a rest position by a biasing member 128. On the other hand, the second shift element 112 is a sliding shift lever with a button 130 designed to be pressed by the rider's thumb in the normal riding position. The second shift element 112 is operatively coupled to the retaining member 124. The second shift element is normally biased to a rest position by a biasing member 132.

The fixed grip portion 30 is preferably constructed of two different elastomeric materials identical to the first and second materials of the cover 68 of the rotatable member 68. The fixed grip portion 30 is also preferably constructed in a manner identical to the cover 68. The fixed grip portion 30 basically includes inner and outer ends 134 and 136 with a fixed gripping surface 138 extending therebetween. The fixed gripping surface 138 includes substantially axially extending portions 140 and 142 (third and fourth portions) that are aligned with the first and second portions 84 and 86 of the actuating surface 82.

As used herein, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle shift control device comprising:
   a fixed member adapted to be fixedly coupled to a bicycle handlebar adjacent a hand gripping area of the handlebar, the hand gripping area having a center longitudinal axis; and
   a rotatable member rotatably coupled to the fixed member for rotation around the handlebar between at least two shift positions,
   one of the fixed and rotatable members having a visible fixed contoured line and the other of the fixed and rotatable members having a visible movable contoured line adjacent the visible fixed contoured line, the visible fixed and movable contoured lines cooperating with each other to define a geometrically shaped visible area located therebetween, the geometrically shaped visible area being configured to visibly change geometric shape upon rotation of the rotatable member between the shift positions to indicate a change in the shift position of the rotatable member based on the change in the geometric shape.

2. The bicycle shift control device according to claim 1, wherein the visible fixed contoured line is substantially parallel to the visible movable contoured line in one of the shift positions.

3. The bicycle shift control device according to claim 2, wherein the visible fixed contoured line is convex and the visible movable contoured line is concaved.

4. The bicycle shift control device according to claim 3, wherein the visible fixed contoured line is formed as a free edge of the fixed member that partially overlaps the rotatable member.

5. The bicycle shift control device according to claim 4, wherein
   the one of fixed and rotatable member with the visible movable contoured line includes a darker colored section and a lighter colored section with the visible movable contoured line is defined by an intersection line between the darker and lighter colored sections.

6. The bicycle shift control device according to claim 4, wherein the rotatable member includes a base element and a cover partially overlying the base element such that a free edge of the cover defines the visible movable contoured line.

7. The bicycle shift control device according to claim 6, wherein
   the base element of the rotatable member extends beyond the free edge of the cover of the rotatable member toward the fixed member, and the free edge of the fixed member that forms the visible fixed contoured line partially overlaps the base element of the rotatable member.

8. The bicycle shift control device according to claim 1, wherein
   the rotatable member includes a base element and a cover partially overlying the base element such that a free edge of the cover defines the visible movable contoured line.

9. The bicycle shift control device according to claim 1, wherein
   one of the visible fixed and movable contoured lines includes a darker colored section and a lighter colored section with an intersection line between the darker and lighter colored sections defining the one of the visible fixed and movable contoured lines.

10. The bicycle shift control device according to claim 1, wherein
one of the fixed and rotatable members has a free edge that partially overlaps the other of the fixed and rotatable members, and the free edge forms one of the visible fixed and movable contoured lines.

11. The bicycle shift control device according to claim 1, wherein
the fixed and rotatable members are configured to provide at least three shift positions with at least three unique geometric shapes being formed by the geometrically shaped visible area that changes upon rotation of the rotatable member between the shift positions.

12. The bicycle shift control device according to claim 11, wherein
the visible fixed contoured line is substantially parallel to the visible movable contoured line in a middle shift position of the shift positions.

13. The bicycle shift control device according to claim 12, wherein
the visible fixed contoured line is convex and the visible movable contoured line is concaved.

14. The bicycle shift control device according to claim 1, wherein
the fixed member includes a gear position indicia that identifies a rotational direction of at least two gear positions.

15. The bicycle shift control device according to claim 1, wherein
the rotatable member forms a part of a first shifter that is configured to be operatively coupled to a first bicycle transmission device, and
the bicycle shift control device further includes a second shifter coupled to the fixed member, the second shifter being configured to be operatively coupled to a second bicycle transmission device.

16. The bicycle shift control device according to claim 15, wherein
the second shifter includes a pair of shift elements configured to be operatively coupled to shift the second bicycle transmission device in response to selectively pressing one of the shift elements.

17. The bicycle shift control device according to claim 15, wherein
the visible fixed contoured line is substantially parallel to the visible movable contoured line in one of the shift positions.

18. The bicycle shift control device according to claim 15, wherein
the visible fixed contoured line is convex and the visible movable contoured line is concaved.

19. The bicycle shift control device according to claim 15, wherein
one of the visible fixed and movable contoured lines is formed as a free edge of the fixed member that partially overlaps the rotatable member.

20. The bicycle shift control device according to claim 15, wherein
one of the visible fixed and movable contoured lines includes a darker colored section and a lighter colored section with an intersection line between the darker and lighter colored sections defining the one of the visible fixed and movable contoured lines.

21. The bicycle shift control device according to claim 15, wherein
one of the fixed and rotatable members has a free edge that partially overlaps the other of the fixed and rotatable members, and the free edge forms one of the visible fixed and movable contoured lines.

22. The bicycle shift control device according to claim 15, wherein
the rotatable member includes a base element and a cover partially overlying the base element such that a free edge of the cover defines the visible movable contoured line.

* * * * *